United States Patent

[11] 3,567,027

[72] Inventor Ken-Ichiro Kurita
 Suita, Japan
[21] Appl. No. 17,153
[22] Filed Mar. 6, 1970
 Division of Ser. No. 780,723, Dec. 3, 1968.
[45] Patented Mar. 2, 1971
[73] Assignee Kurita Machinery Manufacturing
 Company Limited
 Osaka, Japan

[54] APPARATUS FOR RELEASING AND COUPLING
 FILTER PLATES IN A FILTER PRESS
 4 Claims, 2 Drawing Figs.
[52] U.S. Cl..................................................... 210/230,
 100/198, 210/236
[51] Int. Cl..................................................... B01d 25/12
[50] Field of Search........................................... 210/225,
 230, 236; 100/198

[56] References Cited
UNITED STATES PATENTS
3,331,511 7/1967 Kuritz............................. 210/230
3,360,130 12/1967 Kaga............................. 210/225
3,366,243 1/1968 Kurita............................. 210/225

*Primary Examiner*—Reuben Friedman
*Assistant Examiner*—C. M. Ditlon
*Attorney*—Wenderoth, Lind and Ponack ABSTRACT: Each of the filter plates is provided on opposite sides with stud members and actuating members having hook members pivotally mounted on the outer sides thereof and associated therewith. The hook portions of the hook members on a filter plate are adapted to be engaged with stud members on the following adjacent filter plate in the order of separation. Actuating pins to cooperate with the protrusions in the upper portions of the actuating members are provided on the preceding adjacent filter plate. When the preceding plate is released, the actuating members and hook members on the following filter plate adjacent to the preceding plate are forced to function to make the following plate ready for separation.

PATENTED MAR 2 1971

3,567,027

KEN-ICHIRO KURITA, INVENTOR

BY Wenderoth Lind & Ponack

ATTORNEYS

APPARATUS FOR RELEASING AND COUPLING FILTER PLATES IN A FILTER PRESS

BACKGROUND OF THE INVENTION

The present application is a division of my copending U.S. Pat. application Ser. No. 780,723 filed Dec. 3, 1968.

The present invention relates to an apparatus for releasing and coupling filter plates for a filter press and more particularly to an apparatus for releasing and coupling the filter plates one by one in orderly and reliable manner.

In general, the adjacent filter plates in a filter press are stuck to each other quite tightly due to the sticking property of filter cake which is attributable to the quality of the liquid treated. Accordingly, when, for instance, the filter plates are to be moved one by one to remove the filter cake, two or more of the plates are stuck and moved together and there arises a difficulty in releasing them from each other. As a prior art so far proposed to overcome such difficulty, there is U.S. Pat. No. 3,366,243 in which adjacent filter plates are provided, at either side, with a pair of links connected in inversed V-shaped form and having hook members which cooperate with stud members on the adjacent filter plate.

SUMMARY OF THE INVENTION

An object of the present invention is to provide an apparatus in which each of the filter plates is provided with hook members which are adapted for engagement with stud members on the next filter plate and when one filter plate is moved, the hook members on the next filter plate are released from the stud members of the third plate, the apparatus thus making it possible to effect separation of the filter plates one by one successively and reliably.

Another object of the present invention is to provide a structure in which the engagement of the hook members with the stud members is effected by the movement of spring-loaded actuators mounted on each filter plate and to further provide means which, when the actuators fail to operate due to external resistance as by sticking of the filtrate, forces the actuators to function with an exceedingly greater force exerted upon the movement of the filter plate so as to disengage the hook members from the stud members.

DESCRIPTION OF THE PREFERRED EMBODIMENT

Referring to the accompanying drawings, designated at 11 are respective filter plates. These filter plates are movably mounted side by side on unillustrated known rails on opposite sides and are pressed together with filter cloth C disposed between each adjacent filter plates for filtration. When filtering operation is over, the filter plates are released one after another to remove the cake stuck to the filter cloth.

Figure 1:
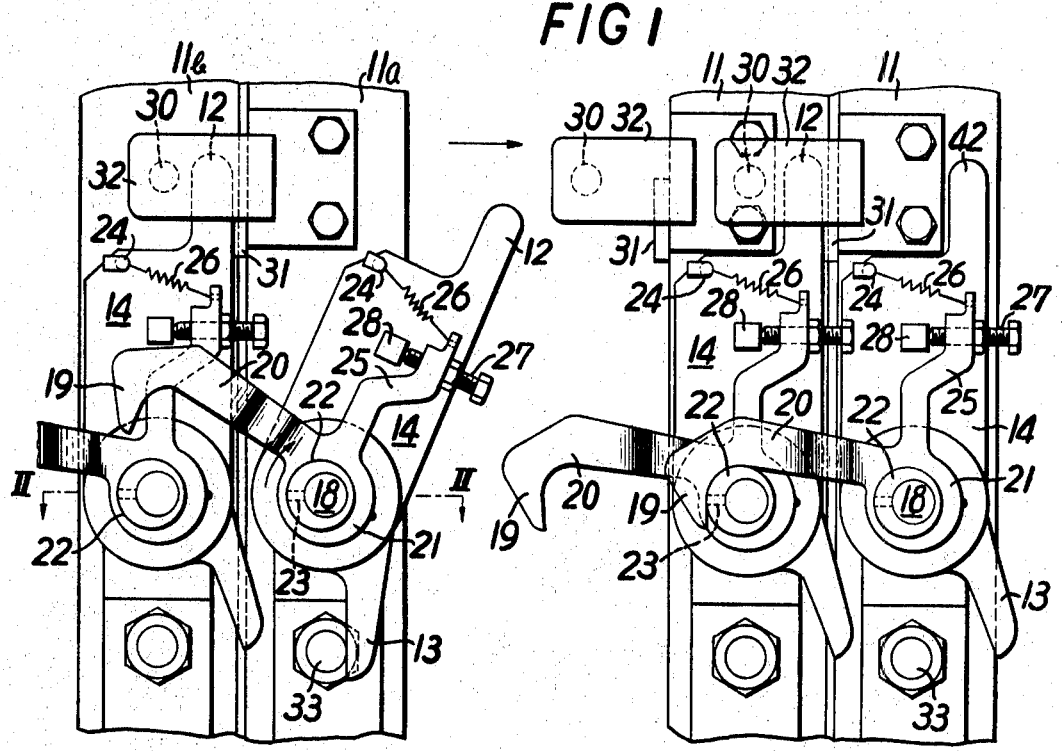
FIG 1 is a front view showing an embodiment of the present invention, the upper and lower portions of the filter plates being omitted.
Figure 2:
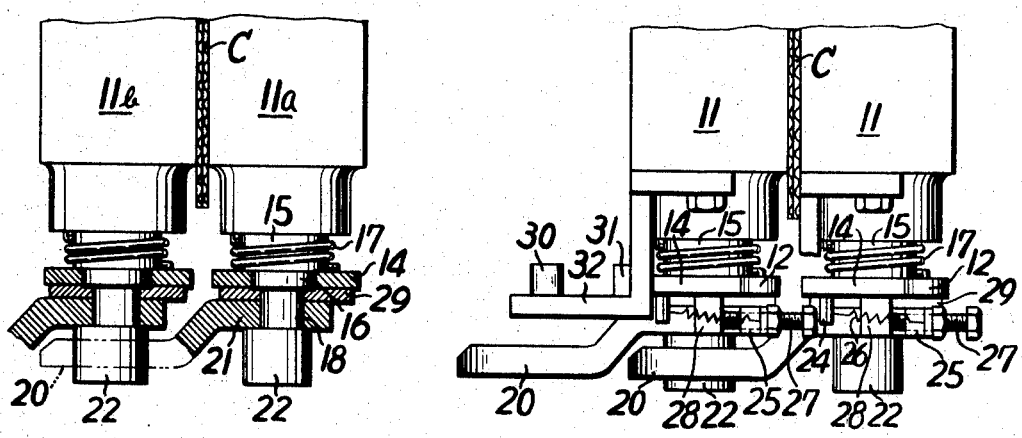
FIG. 2 is a plan view showing the embodiment in FIG. 1 and partly in section along the line II–II in FIG. 1.

In accordance with the present invention, actuating members 14 are provided on the opposite sides of the respective filter plates 11 in the following manner. The actuating member 14 formed with a protrusion 12 at its upper portion and a leg 13 at its lower portion is pivotally mounted on a rod portion 16 of a boss 15 secured to each side of the filter plate 11 (see FIG. 2). The ends of a coil spring 17 wound around the boss 15 are connected to the filter plate 11 and actuating member 14 respectively. A pin 18 which extends from the rod portion 16 and which is smaller than the rod portion in diameter is fitted with a boss 21 of a hook 20 and further with a rin-glike stud 22. The end of a screw 23 having a square hole and driven into the stud 22 fits into one of several recesses (not shown) formed around the extension pin 18, whereby the radius of the stud 22 from the center of the extension pin 18 is adjustably determined. The hook 20 has a slanting face 19 in the head and an adjusting member 25 at another portion. A tension spring 26 is disposed between the end of the adjusting member 25 and a pin 24 on the actuating member 14. An adjusting screw 27 driven through the adjusting member 25 is in contact with a protrusion 28 on the actuating member 14 and serves to adjust the position of the hook 20. Indicated at 29 is a washer.

Attached to each of the filter plates 11 is a protruding member 32 provided with a pin 30 and a reengaging member 31 to be brought into contact with the protrusion 12 of the actuating member 14.

When a filter plate is moved and released as indicated by the arrow, the actuating member 14 is moved pivotally by the spring 17 until the leg 13 contacts a stopper 33. In case the spring 17 is prevented from moving freely by spattered cake and accordingly the actuating member 14 fails to move, the pin 30 on the protruding member 32 pushes the protrusion 12 of the second filter plate 11a forward and inclines the actuating member 14 just as it is inclined by the spring 17. In this manner, the hook 20 attached to the filter plate 11a is disengaged from the stud 22 of the third filter plate 11b. The actuating member 14 of the filter plate 11 which has finished the travel is brought into vertical position when the protrusion 12 strikes the reengaging member 31 on the protruding member 32 attached to the preceding filter plate, and the coil spring 17 is thereby wound up. The hook 20 is now ready for engagement with the stud 22 of the following filter plate.

As a following filter plate approaches the filter plate which has already been separated, the stud 22 on the following filter plate comes into contact with the slanting face 19 of the hook 20 on the preceding filter plate, whereupon the slanting face 19 is pushed upward due to its inclination. After the stud 22 has passed along the slanting face 19, the hook 20 is brought back into engagement with the stud 22 under the action of the spring 26 acting on the adjusting member 25 at the other portion of the hook 20. In this manner, reliable engagement can be achieved.

I claim:

1. An apparatus for releasing and coupling filter plates in a filter press comprising a stud member provided on each side of each filter plate, an actuating member pivotally mounted on each side of each filter plate and adapted to be inclined by a spring, a hook member pivotally mounted on said actuating member and associated therewith for engaging the stud member on a following filter plate, adjusting means relatedly disposed between said hook member and said actuating member, a protrusion formed on said actuating member, and a pin and a reengaging member mounted on each side of each filter plate and being so constructed and arranged along with the protrusion to be brought into engagement with said protrusion on the following filter plate.

2. The apparatus for releasing and coupling filter plates in a filter press as claimed in claim 1 wherein the head portion of said hook member is provided with a slanting face which is adapted to be pushed upward by the stud member on a following filter plate.

3. The apparatus for releasing and coupling filter plates in a filter press as claimed in claim 1 wherein an adjusting member is provided at one portion of said hook member and a spring is disposed between the end of said adjusting member and said actuating member.

4. The apparatus for releasing and coupling filter plates in a filter press as claimed in claim 1 wherein said actuating member is provided with a leg at its lower portion and a stopper to be brought into contact with said leg.